United States Patent
Langtind et al.

(10) Patent No.: US 8,339,414 B2
(45) Date of Patent: Dec. 25, 2012

(54) MONITORING GRAPHICS PROCESSING

(75) Inventors: Frank Klaeboe Langtind, Tiller (NO); Remi Pedersen, Trondheim (NO)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 13/310,008

(22) Filed: Dec. 2, 2011

(65) Prior Publication Data

US 2012/0075321 A1    Mar. 29, 2012

Related U.S. Application Data

(63) Continuation of application No. 12/458,609, filed on Jul. 16, 2009, now Pat. No. 8,144,167.

(30) Foreign Application Priority Data

Jul. 16, 2008 (GB) .................................. 0813028.8

(51) Int. Cl.
*G09G 5/00* (2006.01)

(52) U.S. Cl. ........ 345/612; 345/423; 345/428; 345/581; 345/589; 345/619; 382/165; 382/190; 382/205; 382/206; 700/108; 714/47.1

(58) Field of Classification Search .................. None
See application file for complete search history.

(56) References Cited

U.S. PATENT DOCUMENTS

| | | |
|---|---|---|
| 5,995,113 A | 11/1999 | Mitchell et al. |
| 6,344,852 B1 | 2/2002 | Zhu et al. |
| 7,834,890 B2 | 11/2010 | Fujiki et al. |
| 2003/0025695 A1 | 2/2003 | Morphet |
| 2003/0122833 A1 | 7/2003 | Doyle |
| 2005/0041031 A1 | 2/2005 | Diard |
| 2006/0114261 A1 | 6/2006 | Morphet |
| 2006/0197999 A1 | 9/2006 | Murakami |
| 2007/0139421 A1 | 6/2007 | Chen et al. |

FOREIGN PATENT DOCUMENTS

| | | |
|---|---|---|
| DE | 198 26 512 | 12/1999 |
| GB | 2 374 782 | 10/2002 |
| JP | 10-105435 | 4/1998 |
| JP | 2000-132349 | 5/2000 |
| JP | 2000-132350 | 5/2000 |
| JP | 2004-537129 | 12/2004 |
| JP | 2005-122572 | 5/2005 |
| JP | 2005-514711 | 5/2005 |
| JP | 2006-221567 | 8/2006 |

(Continued)

OTHER PUBLICATIONS

U.S. Appl. No. 12/458,609, filed Jul. 16, 2009; Inventor: Langtind et al.

(Continued)

*Primary Examiner* — Antonio A Caschera
(74) *Attorney, Agent, or Firm* — Nixon & Vanderhye P.C.

(57) ABSTRACT

A graphics processing apparatus is provided with rendering circuitry which separately renders different areas of a frame of pixel values. Monitoring circuitry coupled to the rendering circuitry captures for each area rendered one or more parameters and stores these parameters to a parameter memory. A performance frame can be generated from the captured and stored parameters with performance-representing pixel values for each area within the performance frame corresponding to an area within the image frame and having a visual characteristic selected in dependence upon the performance parameter which was captured. The visual characteristic may be a grey-scale value, a pixel intensity or a pixel color.

17 Claims, 7 Drawing Sheets

FOREIGN PATENT DOCUMENTS

JP     2007-503059     2/2007

OTHER PUBLICATIONS

Office Action mailed Dec. 10, 2010 in co-pending U.S. Appl. No. 12/458,609.

Office Action mailed May 4, 2011 in co-pending U.S. Appl. No. 12/458,609.

Office Action mailed Aug. 24, 2011 in co-pending U.S. Appl. No. 12/458,609.

Search Report for UK 0813028.8 dated Oct. 30, 2008.

Search Report for UK 0813028.8 dated Feb. 19, 2009.

Japanese Office Action mailed Oct. 2, 2012 in Japanese Application No. 2009-161993.

Peter N. Glaskowsky, Microprocessor Report; Intel, LSI, Japan, Apr. 6, 1988, vol. 713, pp. 55-65 (No English translation).

Image frame

| 0 | 0 | 0 | 0 | 0 | 0 | 0 | 0 | 0 | 0 |
|---|---|---|---|---|---|---|---|---|---|
| 0 | 0 | 0 | 0 | 0 | 1 | 1 | 1 | 1 | 0 |
| 0 | 2 | 2 | 2 | 2 | 3 | 3 | 2 | 2 | 0 |
| 0 | 2 | 2 | 2 | 2 | 3 | 3 | 2 | 1 | 0 |
| 0 | 1 | 2 | 2 | 2 | 3 | 3 | 1 | 1 | 0 |
| 0 | 1 | 1 | 2 | 2 | 3 | 3 | 1 | 1 | 0 |
| 0 | 1 | 1 | 2 | 2 | 3 | 2 | 1 | 1 | 0 |
| 0 | 1 | 1 | 1 | 2 | 2 | 2 | 1 | 1 | 0 |
| 0 | 1 | 1 | 1 | 1 | 2 | 2 | 1 | 1 | 0 |
| 0 | 0 | 0 | 0 | 0 | 0 | 1 | 0 | 0 | 0 | number of primatives in tile

Performance Parameter Array

MONITORING GRAPHICS PROCESSING

This application is a continuation of U.S. application Ser. No. 12/458,609, filed on Jul. 16, 2009, now U.S. Pat. No. 8,144,167, which claims priority of United Kingdom Application No. 0813028.8 filed Jul. 16, 2008, the entire contents of each of which are hereby incorporated by reference.

TECHNICAL FIELD

This technical field relates to the field of graphics processing. The technology described in this application relates to the monitoring of graphic processing performed in rendering different areas of a frame.

BACKGROUND

Graphics processing is a computationally intensive task. In order that such graphic processing can be performed efficiently it is often necessary to adapt the processing being performed or the system which is performing that processing so as, for example, to reduce performance bottlenecks. The effects which give rise to performance bottlenecks and other operating characteristics can be subtle and it can be difficult to identify the cause of low performance or other problem.

It is known to provide graphics processing systems with monitoring circuitry which is able to capture diagnostic/performance information in respect of graphics processing operations that are performed. Such information may, for example, tell the hardware designer or application author how many processing cycles of the graphics processing apparatus are used in rendering each frame. While such mechanisms may be useful in identifying that a problem exists, such that an excessive number of processing cycles are required, there exists a difficulty in understanding what is causing such problems. Techniques which can assist in the understanding of the complex behavior of graphics processing systems to identify problems therein are advantageous.

SUMMARY

A graphics processing apparatus for rendering a frame of pixel values representing a scene comprises:
rendering circuitry for rendering separately different areas of said frame;
monitoring circuitry coupled to said rendering circuitry to capture for each area rendered one or more parameters; and
a parameter memory coupled to said monitoring circuitry to store separately for each area said one or more parameters captured by said monitoring circuitry.

The present technique recognizes that capturing parameters in respect of each of a plurality of separately rendered areas within a frame permits a more ready understanding of effects which give rise to those parameters, and potential problems which they may indicate. For example, a parameter indicating an excessive cycle count associated with a particular area within a frame rendered will allow a user to concentrate on properties particular to the area which gave rise to that excessive cycle count when identifying its cause. Permitting a ready correlation between monitored parameters that are captured and the corresponding areas within a frame rendered considerably facilitates diagnostic, optimization and other activities.

It will be appreciated that the rendering performed by the graphics processing apparatus could take a wide variety of different forms. In one example, the scene rendered may include one or more primitives and the frame be formed of a plurality of tiles of pixel values.

In the above context, the rendering circuitry may be a tile-based rendering circuitry which reads data characterizing one or more primitives and renders a sequence of tiles to generate the overall frame with each of the tiles being rendered in turn for a selection of the primitives that are identified as potentially intercepting the tile.

The separate rendering of each tile in such systems is well suited to the separate capture and storage of parameters associated with that rendering.

It will be appreciated that the parameters captured and stored can have a wide variety of forms. The parameters may be diagnostic in a general sense. However, the present technique is particularly well suited to uses where the parameters monitored, captured and stored are performance parameters.

It is advantageous if the action of the monitoring circuitry does not interfere with the rendering circuitry as this could give rise to inaccurate and/or misleading parameters being captured, e.g. if the action of capturing and storing parameters interferes with memory accesses required by the rendering circuitry, then a decrease in performance may be observed as a result of the monitoring, capture and storage rather than as a consequence of defects present without such monitoring, capture and storage.

In some non-limiting, example embodiments, the rendering circuitry upon completion of rendering a currently active area writes pixel values for that currently active area to a frame memory. The monitoring circuitry can be formed to write the one or more parameters to the parameter memory at times when the rendering circuitry does not have rendered pixel values for a completed area to be written to the frame memory. In this way, the writing of the parameters to the parameter memory can be performed when the rendering circuitry is not trying to perform its own writes and accordingly the monitoring circuitry will have a low impact upon this aspect of the performance of the graphics processing apparatus.

Whilst it will be appreciated that the parameter memory and the frame memory may be separately provided, it is convenient if these form part of a common shared memory. Providing a special purpose parameter memory only for use by the monitoring circuitry would be wasteful as in field use when monitoring was not required, such a dedicated parameter memory would lie idle. If the parameter memory forms part of a common shared memory, then that common shared memory may be used for other purposes when not required to store the parameters generated by the monitoring circuitry and there is also greater flexibility in the size of parameter memory that can be used.

The monitoring circuitry can take a wide variety of different forms. Providing the monitoring circuitry in the form of one or more counters coupled to respective points within the graphics processing apparatus to count events associated with the rendering of each area provides a low overhead monitoring mechanism which is capable of providing a wide variety of useful parameters.

The flexibility of the monitoring circuitry can be improved by the provision of parameter selecting circuitry associated with one or more of the counters and responsive to a parameter selecting signal to select which points/event within the graphics processing apparatus is to be counted by the counter concerned. In this way, the overhead associated with the monitoring circuitry can be reduced since relatively few counters need be provided and if a wide range of parameters need capturing then this can be achieved by re-executing the rendering of the same frame with different parameter selecting signals such that the counters count different events upon different renderings.

The above flexibility is aided when the parameter selecting signal is a user programmable signal.

It will be appreciated that the parameters which are monitored can have a wide variety of different forms. Particularly useful parameters which may be monitored include a number of processing cycles used by the graphics processing apparatus in rendering an area, a number of cache misses within a cache memory of the graphics processing apparatus when rendering an area, a number of bus transactions on a bus coupled to the graphics processing apparatus when rendering an area and a number of primitives identified as potentially intercepting an area that are processed when rendering the area. It will be appreciated that many different and/or alternative parameters to the above may also be monitored, captured and stored in different embodiments. The present techniques encompass a wide variety of different parameters as may be deemed appropriate/useful in a particular graphics processing apparatus.

The parameters may be stored within the parameter memory in a variety of different ways. However, it is convenient if the parameters are stored within the parameter memory such that upon completion of rendering of a frame, the parameter memory contains an array of parameters corresponding to an array of areas forming the frame which has been rendered. Such a one-to-one correspondence between the areas and the elements of the parameter array facilitates a ready understanding of the parameter data and a simplified processing of that parameter data to assist such an understanding.

A method of generating monitoring data for a graphics processing apparatus rendering a frame of pixel values representing a scene comprises the steps of:

separately rendering different areas of said frame;

capturing for each area rendered one or more parameters; and separately storing for each area said one or more parameters captured.

Viewed from a further aspect, a method of analyzing a graphics processing apparatus separately rendering different areas of an image frame representing a scene comprises the steps of:

reading an array of one or more parameters stored within a parameter memory for respective areas of said frame; and generating a parameter frame with areas of parameter-representing pixel values having at least one visual characteristic selected in dependence upon at least one parameter of a corresponding area within said image frame.

As well as the capture of parameter data for the rendering on an area-by-area basis discussed above, a complementary aspect provides a method of analyzing a graphics processing apparatus separately rendering different areas of an image frame representing a scene, said method comprising the steps of:

reading an array of one or more parameters stored within a parameter memory for respective areas of said frame; and generating a parameter frame with areas of parameter-representing pixel values having at least one visual characteristic selected in dependence upon at least one parameter of a corresponding area within said image frame.

Having separately captured parameter data in respect of areas which are separately rendered within a frame, this aspect of the present technique serves to read such an array of parameters and generate a parameter frame for display with areas of parameter-representing pixel values with at least one visual characteristic selected in dependence upon at least one parameter of a corresponding area within the image frame.

In this way, the captured parameter data can be displayed as a parameter frame on an area-by-area basis in a manner which considerably facilitates the understanding of the parameter data, such as by facilitating a comparison between the parameter frame and the image frame so as to identify areas of the image frame giving rise to parameter values of note.

As previously, the rendering of the image frame can be performed in a variety of different ways giving rise to area-by-area processing, but the present technique is particularly well suited to tile-based rendering. Furthermore, the parameters stored within the parameter memory can have many different forms, but the present technique is well suited to use when the parameters are performance parameters.

The visual characteristics of the parameter-representing pixel values could be selected in a variety of different ways. Some visual characteristics which are particularly useful in permitting a ready understanding of the captured parameter data using a parameter frame are a pixel grey-scale value, a pixel intensity and/or a pixel color.

While it is possible that only one parameter frame may be generated from the parameter values captured, it may be advantageous in some example embodiments to capture multiple arrays of parameters (or an array with multiple parameter elements) such that a plurality of parameter frames may be generated for each image frame with different parameter frames having areas with pixel values dependent upon different parameters. The effects which give rise to performance bottlenecks and the like can be subtle and problems sometimes can be more readily identified using multiple parameter frames such that combinations of effects for particular areas within the image frame can be identified.

It will be appreciated that in many embodiments the graphics processing apparatus is part of an integrated circuit and it may be convenient that the steps of reading and generating mentioned above are performed with a general purpose computer coupled to the integrated circuit concerned. General purpose computers coupled to an integrated circuit in this way for diagnostic/performance monitoring reasons will be familiar to those in this technical field during the design and debugging phases of hardware and software development.

A computer program storage media stores a computer program for controlling a general purpose computer in accordance with the above methods of reading and generating.

The graphics processing apparatus incorporating the monitoring circuitry and the parameter memory may require such features to be configured for use. Accordingly, another aspect of the present technique provides a computer program storage media storing a driver computer program for controlling a graphics processing apparatus as discussed above and in particular permitting user selection of the one or more parameters to be captured.

Such a driver computer program may be executed by the integrated circuit of which the graphics processing apparatus forms a part or within the user device of which the graphics processing apparatus forms part, such as a driver which initializes and controls the graphics processing apparatus.

The driver program may also permit user selection of a storage location to be used as the parameter memory.

The above, and other objects, features and advantages will be apparent from the following detailed description of illustrative embodiments which is to be read in connection with the accompanying drawings.

DESCRIPTION OF NON-LIMITING, EXAMPLE EMBODIMENTS

Figure 1:
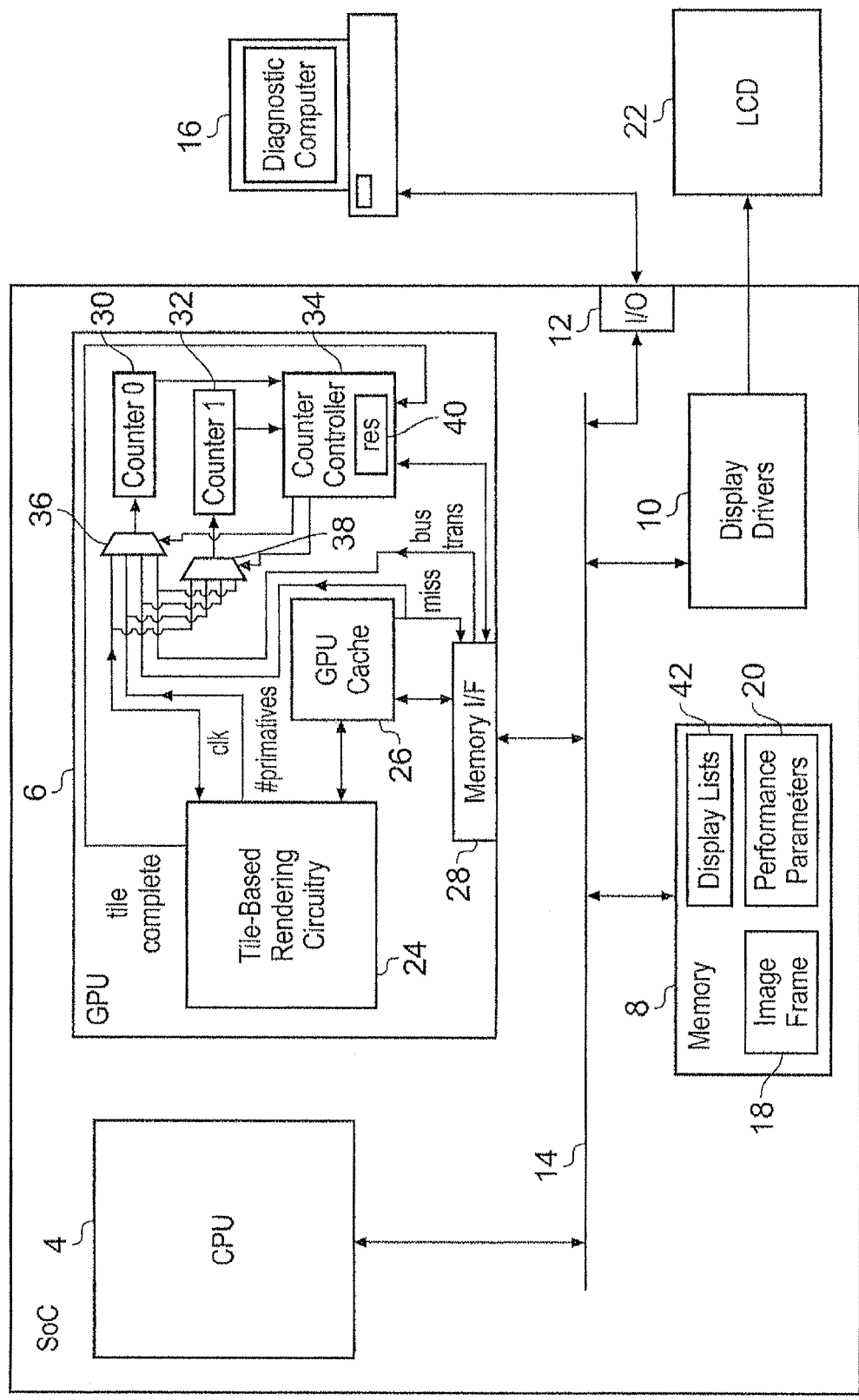
FIG. 1 schematically illustrates a system-on-chip integrated circuit incorporating a graphics processing unit and coupled to a diagnostic general purpose computer and an LCD display.

FIG. 1 schematically illustrates a system-on-chip integrated circuit 2 including a central processing unit 4 (such as a general purpose ARM processor), a graphics processing unit 6, a memory 8, a display driver 10 and an input output circuit 12 all coupled via a system bus 14. A general purpose computer 16 as will be described in connection with FIG. 8 in the following text is connected to the input output circuit 12 to permit the reading of data from the memory 8 and the writing of data to the memory 8. The data read from the memory 8 by the general purpose computer 16 can include image frame data 18 as well as an array of performance parameter data 20. The general purpose computer 16 can display the image frame data 18 and generate and display a performance frame using the array of performance data 20 so as to facilitate understanding of processing being performed by the graphics processing unit 6. The performance parameter data can represent a wide variety of different parameters. Examples of these parameters will be discussed below.

In normal (non-diagnostic) operation the graphics processing unit 6 generates image frame data 18 for display on an attached LCD 22 using the display driver 10. The graphics processing unit 6 performs three dimensional graphics processing such as includes tile-based rendering of the type performed by the MALI graphics processing units design by ARM Limited of Cambridge, England.

The graphics processing unit 6 includes tile-based rendering circuitry 24 and a graphics processing unit cache 26 together with a memory interface 28 for connecting to the system bus 14. It will be appreciated that in practice the graphics processing unit 6 will typically include many further circuit elements but these have been omitted from FIG. 1 for the sake of clarify.

Also shown within FIG. 1 is monitoring circuitry including counters 30, 32 controlled by a counter controller 34 and supplied with respective signals to be counted via multiplexers 36, 38. Each of the multiplexers 36, 38 receives four input signals respectively coupled to different points within the graphics processing unit 6 so as selectively to monitor the number of processing clock cycles used by the graphics processing unit 6, the number of primitives identified as potentially intersecting a tile being rendered by the tile-based rendering circuitry 24, a miss within the graphics processing unit cache 26 and a bus transaction as performed by the memory interface circuit 28. The multiplexers 36, 38 select different event signals to monitor and supply these to their respective counters 30, 32 so as to be counted. The counter controller 34 is responsive to a user programmable value within a memory mapped register 40 to select the signals passed by the multiplexers 36, 38 to the counters 30, 32. Thus, a user can write to the register 40 to select which of the parameters are to be monitored and form the performance parameter array when an image frame is rendered. The register 40 is also user programmable to specify a storage location within the memory 8 at which the performance parameter array data 20 will be stored.

The counter controller 34 is responsive to a tile complete signal generated by the tile-based rendering circuitry 24 to trigger the counter controller 34 to read the current values of the counters 30, 32 and send these values to the memory interface circuitry 28 to be written into the memory 8 as part of the performance parameter array data 20 at a position corresponding to the tile rendered which gave rise to those count values. The count values may be cumulative or may be reset each time they are read depending upon the nature of the count concerned.

The memory interface circuitry 28 is also responsible for writing pixel values of the rendered tile generated by the tile-based rendering circuitry 24 into the image frame 18 of the memory 8. Such writing of the pixel values of the tile rendered takes place in bursts as each tile is completed and the writing of the parameter data to the performance parameter array 20 can be fitted into the gaps between the writing of the pixel values of the tile data such that the writing of the parameters does not interfere with the performance of the graphics processing unit 6. The memory interface 28 may be arranged to arbitrate between the writes from the tile-based rendering circuitry 24 and the writes from the counter controller 34 such that the writes from the tile-based rendering circuitry 24 always have high priority.

Tile-based rendering in this example is performed using tiles which contain 16*16 pixel values (although it will be appreciated that other sizes and shapes of tiles are possible). A display list 42 stored within the memory 8 stores lists of primitives which potentially intersect each tile to be rendered by the tile-based rendering circuitry. The display lists 42 may be generated by the general purpose processor 4 and stored within the memory 8. The graphics processing unit 6 serves to render each tile on a tile-by-tile basis by reading the display list 42 and then calculating each pixel value depending upon the data identifying the primitives potentially intersecting the tile concerned and taking into account any texture, shading or other graphics controlling data which may also be in use. When the tile has been generated, the array of 16*16 pixel values are written into the corresponding position within the image frame 18 of the memory 8. Such tile-by-tile processing is distinguished from what is normally termed immediate mode processing in which the image is formed by rendering each primitive in turn on a primitive-by-primitive basis into the image frame 18 as a whole.

The parameters monitored can take a wide variety of different forms. Particularly useful parameters to monitor include a number of processing cycles used by the graphics processing unit 6 in rendering each tile, a number of cache misses within the graphics processing unit cache 26 when rendering each tile, a number of bus transactions on the system bus 14 performed by the memory interface circuitry 28 when rendering each tile and/or a number of primitives identified as potentially intersecting a tile being processed as identified by the tile-based rendering circuitry 24 from reading the display list 42.

Figures 2, 3:
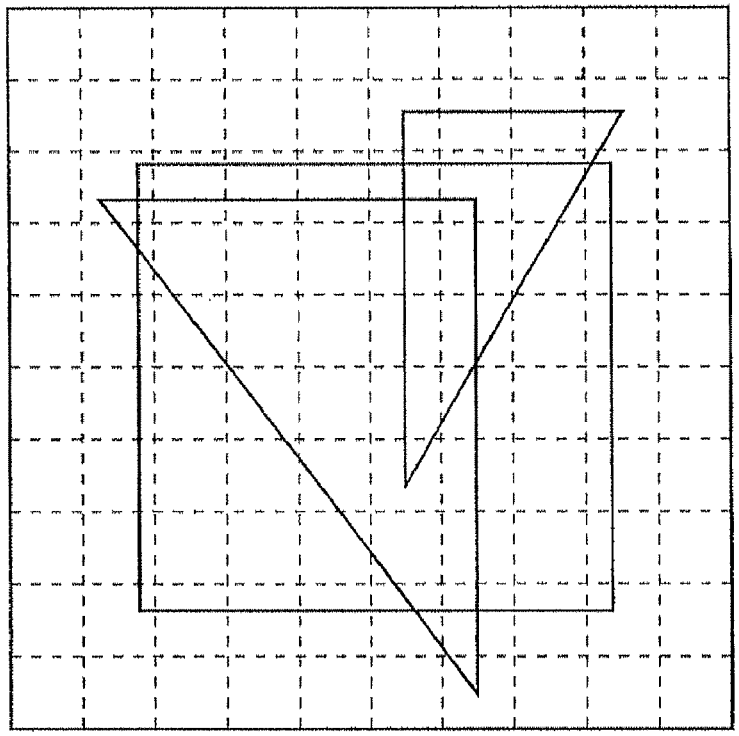
FIG. 2 schematically illustrates an image frame containing three primitives to be rendered and composed of an array of tiles of pixel values which are separately rendered on a tile-by-tile basis.
FIG. 3 schematically illustrates a performance parameter array of captured parameter values corresponding to the image frame of FIG. 2 and representing the number of primitives potentially intersecting respective tiles.

FIG. 2 schematically illustrates a simple image frame to be rendered. This image frame contains three primitives in the form of two triangles and one square. It will be seen that the image frame is composed of an array of 10*10 tiles and each of these tiles contains 16*16 pixel values. Each tile is rendered in turn by the tile-based rendering circuitry 24. As each tile is rendered, the display list 42 within the memory 8 is read to identify the number of primitives potentially intersecting that tile. This number of primitives data is output by the tile-based rendering circuitry 24 and is captured within one of the counters, 30, 32.

FIG. 3 illustrates a performance parameter array corresponding to the image frame of FIG. 2 in which the number of primitives potentially intersecting each tile within the array has been captured and stored. It will be seen that there is a parameter value representing the number of primitives stored in respect of each tile within the image frame. There is a one-to-one correspondence in this example between the tiles of the image frame of FIG. 2 and the parameter value stored within the performance parameter array of FIG. 3. It will be appreciated that each entry within the performance parameter array of FIG. 3 could include multiple different parameters relating to the same tile, such as a number of primitives count, a cycle count, a cache miss count, a number of memory transactions count etc. As an alternative, separate performance parameter arrays could be kept in respect of different performance parameters being monitored and captured. It will be observed from FIG. 3 that even though the number of primitives associated with each tile is a relatively straight forward parameter to capture and count, the interpretation of the array of data illustrated in FIG. 3 is not straight forward even though it is illustrated in FIG. 3 in the form of two dimensional array.

Figure 4:
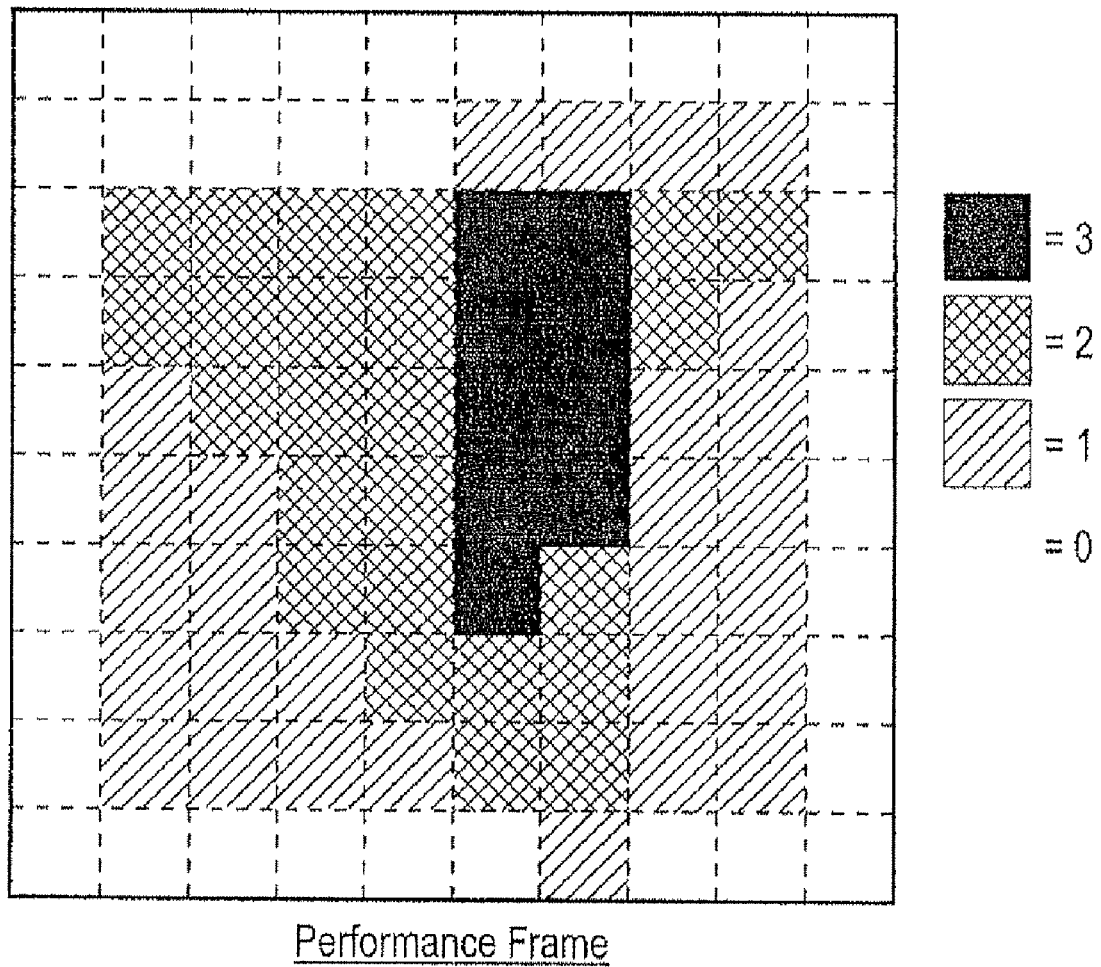
FIG. 4 schematically illustrates a performance frame generated from the performance parameter array of FIG. 3 in which each tile of pixel values within the performance frame has a visual characteristic corresponding to the parameter value associated with the corresponding tile within the image frame of FIG. 2 as read from the performance parameter array of FIG. 3.

FIG. 4 illustrates how a performance frame may be generated from the performance parameter array of FIG. 3 in order to facilitate understanding and interpretation of the performance parameters which have been captured. The performance frame of FIG. 4 is formed with tiles in one-to-one correspondence with the tiles of the image frame of FIG. 2 and the data values stored within the performance parameter array of FIG. 3. For the sake of convenience, the tiles within the performance frame can have the same size as the tiles within the image frame of FIG. 2, namely formed of 16*16 parameter-representing pixel values with at least one visual characteristic selected in dependence upon the corresponding parameter value within the performance parameter array of FIG. 3. It will be seen from the performance parameter array of FIG. 3 that the maximum number of primitives for any tile is 3 and the minimum number is 0. The maximum and minimum values can be searched for within the performance parameter array and used to effectively select the mapping between parameters and visual characteristics of the parameter-representing pixel values within the performance frame of FIG. 4. Another approach would be to allow the user to manually select the mapping to be used, such as manually selecting minimum and maximum values and which visual characteristics these corresponded to with the visual characteristic varying in a predetermined manner in dependence upon the parameter value between these minimum and maximum values. The minimum and maximum values can be determined on the basis of a single performance parameter array or they may be determined based upon multiple performance parameter arrays for the same parameter. Setting the mapping taking into account the parameter values of multiple arrays captured for the same parameter may be preferable as it may more readily allow unusual parameter values within individual performance frames to be identified. The example shown in FIG. 4 associates solid shading with the tiles for which three primitives were potentially intersecting, cross hatched shading for tiles with two primitives, diagonal shading with tiles for one primitive and no shading for tiles with zero primitives. In this way, the tiles for which the highest number of primitives required consideration can be readily identified and a visual comparison may be made with the image frame of FIG. 2 should such a high number of primitives be considered a problem. The nature of the image frame giving rise to such a high number of primitives may then be adapted if needed.

It will be appreciated that the above is only one example of how a performance frame may be formed. The visual characteristic varied in dependence upon the parameter value can have a wide variety of different forms. As an example, the visual characteristic may be a pixel grey-scale value, a pixel intensity and/or a pixel color. Other visual characteristics (e.g. flashing when over a certain parameter value) may also be envisaged and used if desired.

Figure 5:
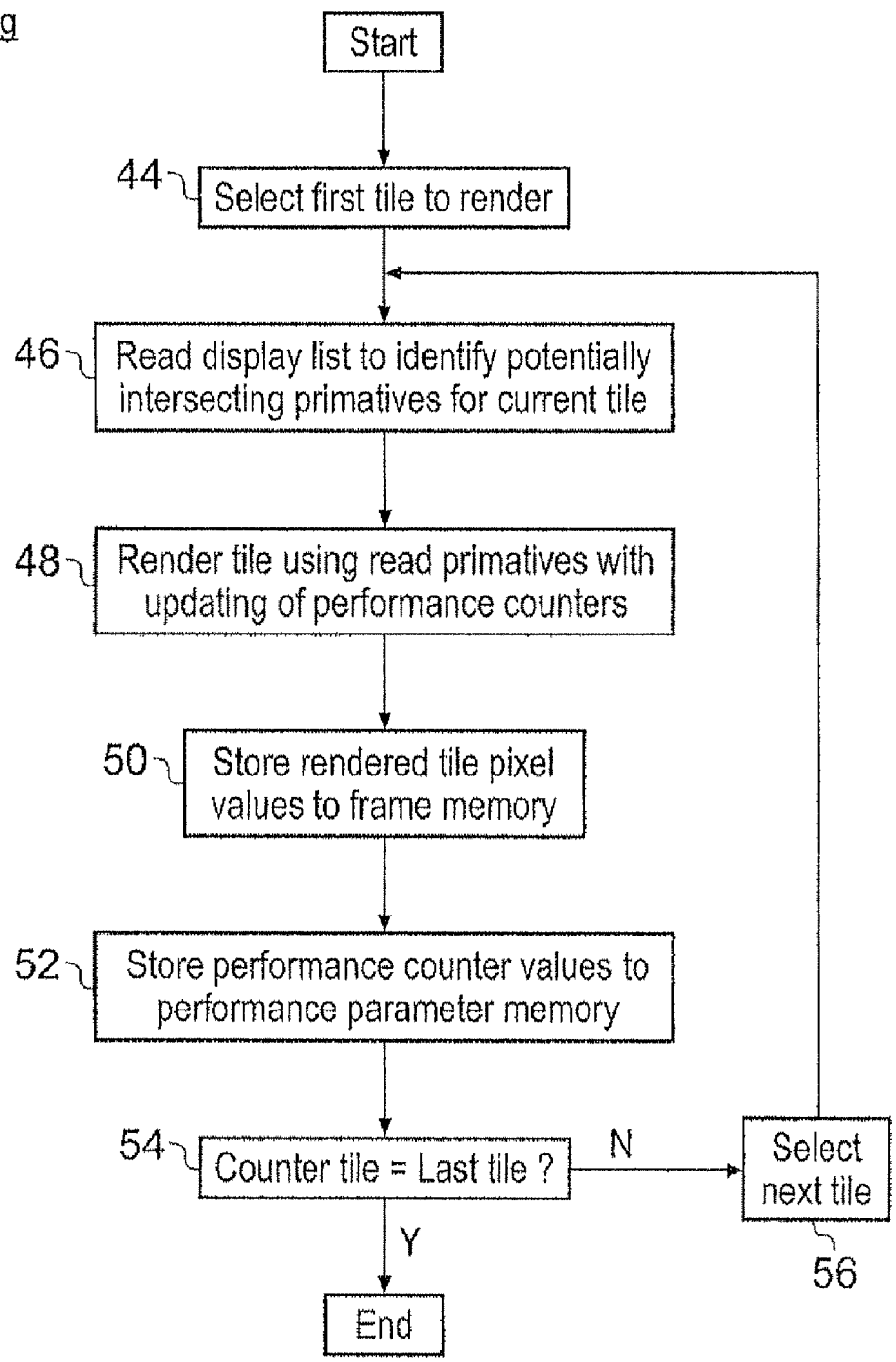
FIG. 5 is a flow diagram schematically illustrating the tile rendering performed by the graphics processing unit of FIG. 1 including the capture of counter values and the storage of counter values as parameters to a parameter memory.

FIG. 5 schematically illustrates a flow diagram corresponding to processing performed by the tile-based rendering circuitry 24. At step 44 the first tile to be rendered is selected. At step 46 the display list 42 is read to identify the primitives which potentially intersect the current tile. Step 48 renders the tile using the primitives read and also updates the counters 30, 32 in dependence upon the currently selected parameters being monitored. At step 50, the array of rendered pixel values are written into the image frame 18 within the memory 8. At step 52 the performance counter values from the counters 30, 32 for the tile which has just been rendered are written into the performance parameter array 20 by the counter controller 34 via the memory interface circuitry 28. Step 54 identifies whether the current tile is the last tile within the image frame. If the current tile is not the last tile, then step 56 selects the next tile and processing returns to step 46, otherwise the tile rendering of the image frame has been completed.

Figure 6:
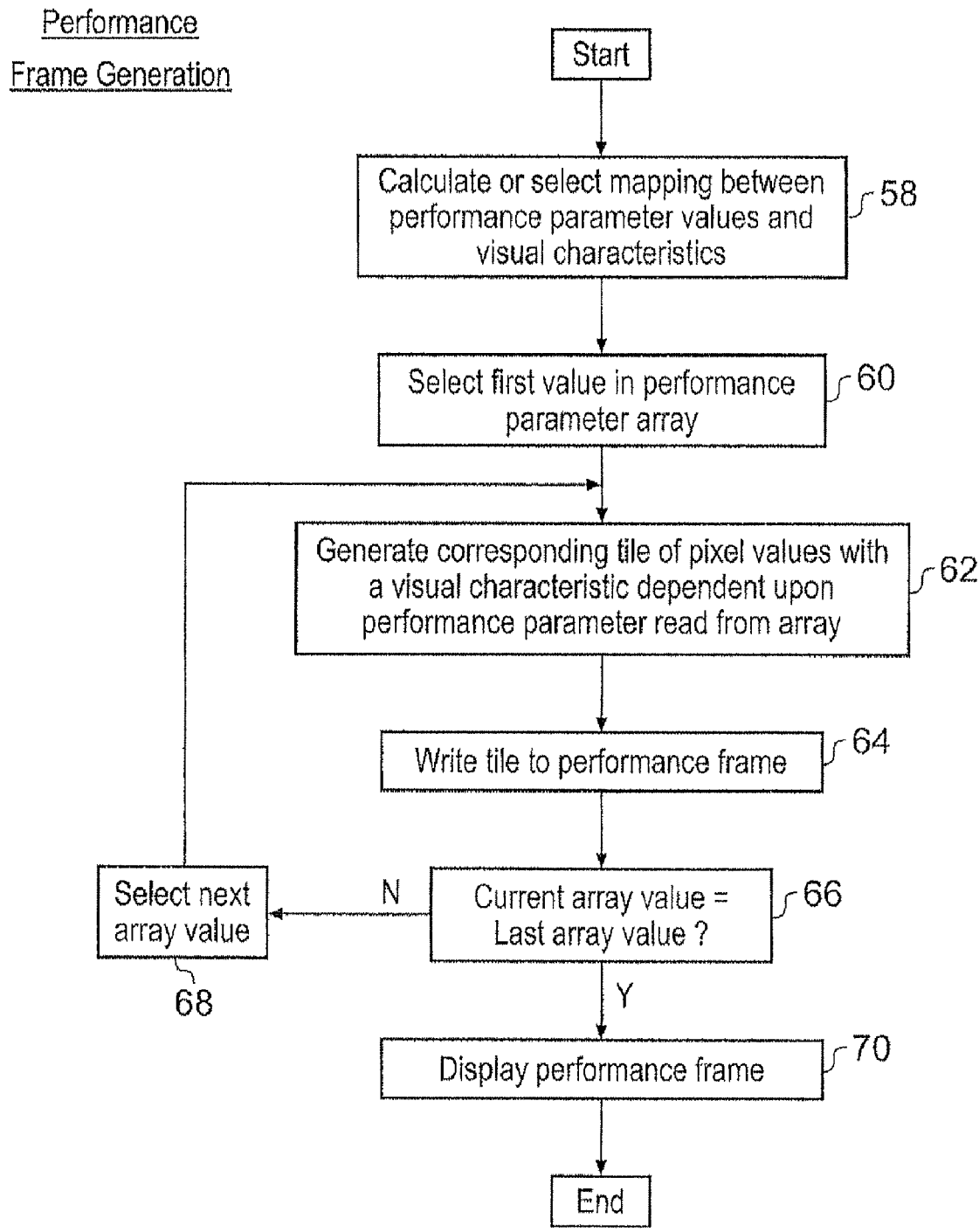
FIG. 6 is a flow diagram schematically illustrating how a performance frame such as is illustrated in FIG. 4 may be generated from a performance parameter array such as is illustrated in FIG. 3.

FIG. 6 is a flow diagram schematically illustrating the generation of a performance frame, such as illustrated in FIG. 4, from an array of parameter values, such as illustrated in FIG. 3. The processing illustrated in FIG. 6 may be performed by the diagnostic computer 16 of FIG. 1, which has read the array of performance data 20 from the memory 8 via the input output unit 12. At step 58 the mapping between performance parameter values and visual characteristics is either calculated or selected as previously discussed. At step 60 the first value in the performance parameter array is selected. Step 62 generates a corresponding tile of performance-representing pixel values with a visual characteristic dependent upon the performance parameter read from the array at step 60. At step 64 the tile of performance-representing pixel values are written to the performance frame of FIG. 4. Step 66 determines whether the current parameter value within the array is the last array value. If the current parameter value is not the last array value, then step 68 selects the next array value and processing returns to step 62. If all of the array values have been mapped to performance-representing pixel values such that the full performance frame of FIG. 4 has been generated, then processing proceeds to step 70 where the performance frame is displayed on the diagnostic computer 16. The processing illustrated in FIG. 6 may be performed by the diagnostic computer 16 under control of a computer program stored on a computer readable storage medium, such as a disk memory, etc.

Figure 7:
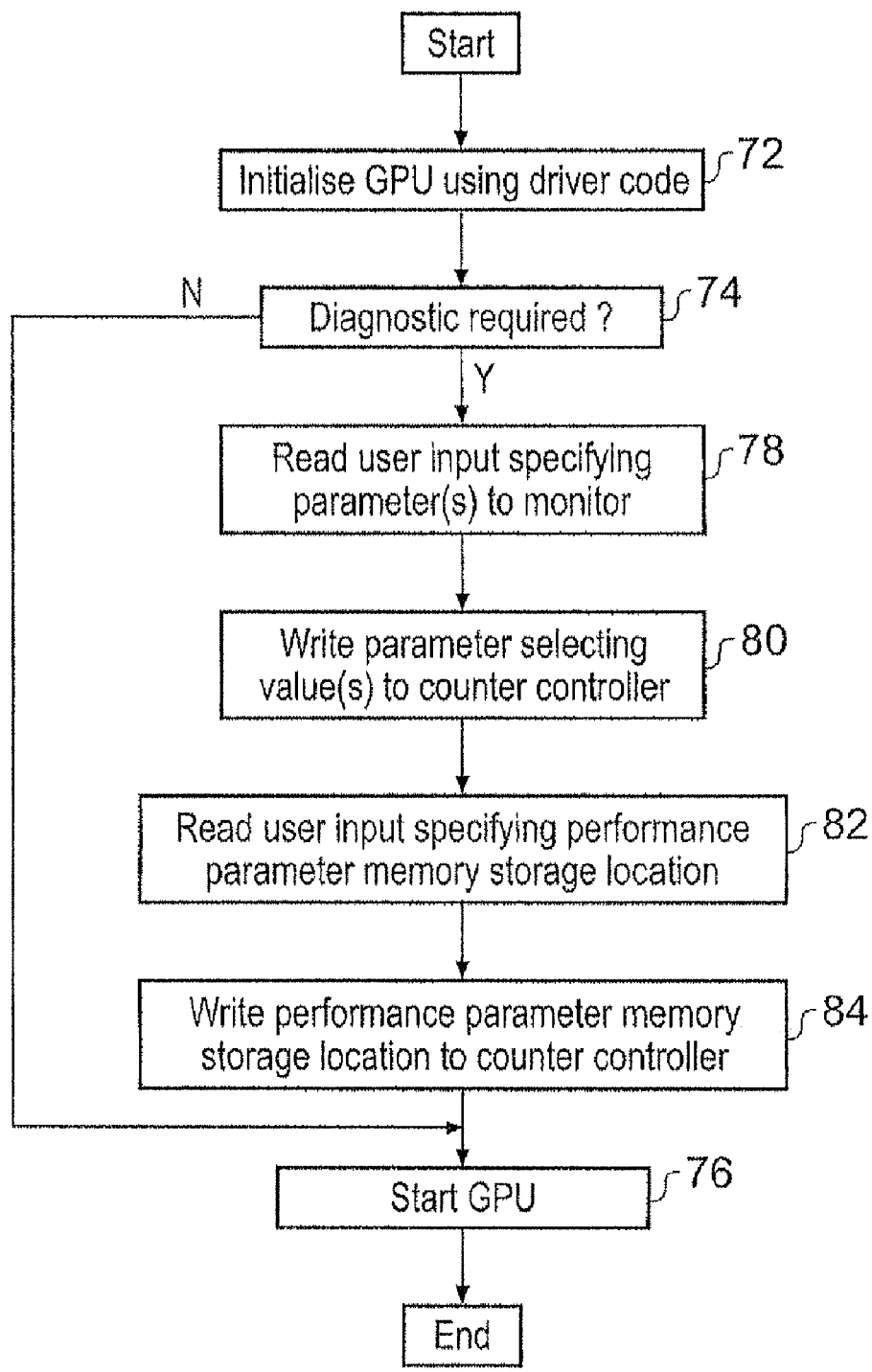
FIG. 7 schematically illustrates the action of a driver computer program in initializing a graphics processing unit including initializing the monitoring circuitry (counters and counter controller)

FIG. 7 is a flow diagram schematically illustrating the action of a driver computer program in initializing the graphics processing unit 6 of FIG. 1. The driver computer program may be executed by the general purpose processor 4 in FIG. 1 and may be stored within the memory 8. At step 72, the graphics processing unit 6 is initialized other than in respect of its diagnostic capabilities with which the present technique is concerned. At step 74 a determination is made as to whether or not diagnostics are required to be run. If diagnostics are not required, then processing proceeds to step 76 where the graphics processing unit 6 is started.

If diagnostics are required, then step 78 reads a user input specifying which parameters are to be monitored. This user input could be made via the diagnostic computer 16. The user input could also be made in a number of other ways, such as via a input device associated with the apparatus of which the system-on-chip integrated circuit 2 performs a part. The user input specifying which parameters to monitor writes to the register 40 within the counter controller 34 and accordingly generates corresponding control signals for the multiplexers 36, 38 as previously discussed. The writing of the parameter selecting value to the counter controller 34 takes place at step 80. At step 82, further user input is read specifying which memory storage location is to be used for the performance parameter array 20. When this user input has been received, step 84 writes this memory storage location specifying information into the register 40 of the counter controller 34 such that the counter controller 34 will generate appropriately addressed memory transactions to the memory 8 in respect of parameter data to be written into the performance parameter array 20 as each tile is completed. Processing then proceeds to step 76 where the graphics processing unit 6 is started.

Figure 8:
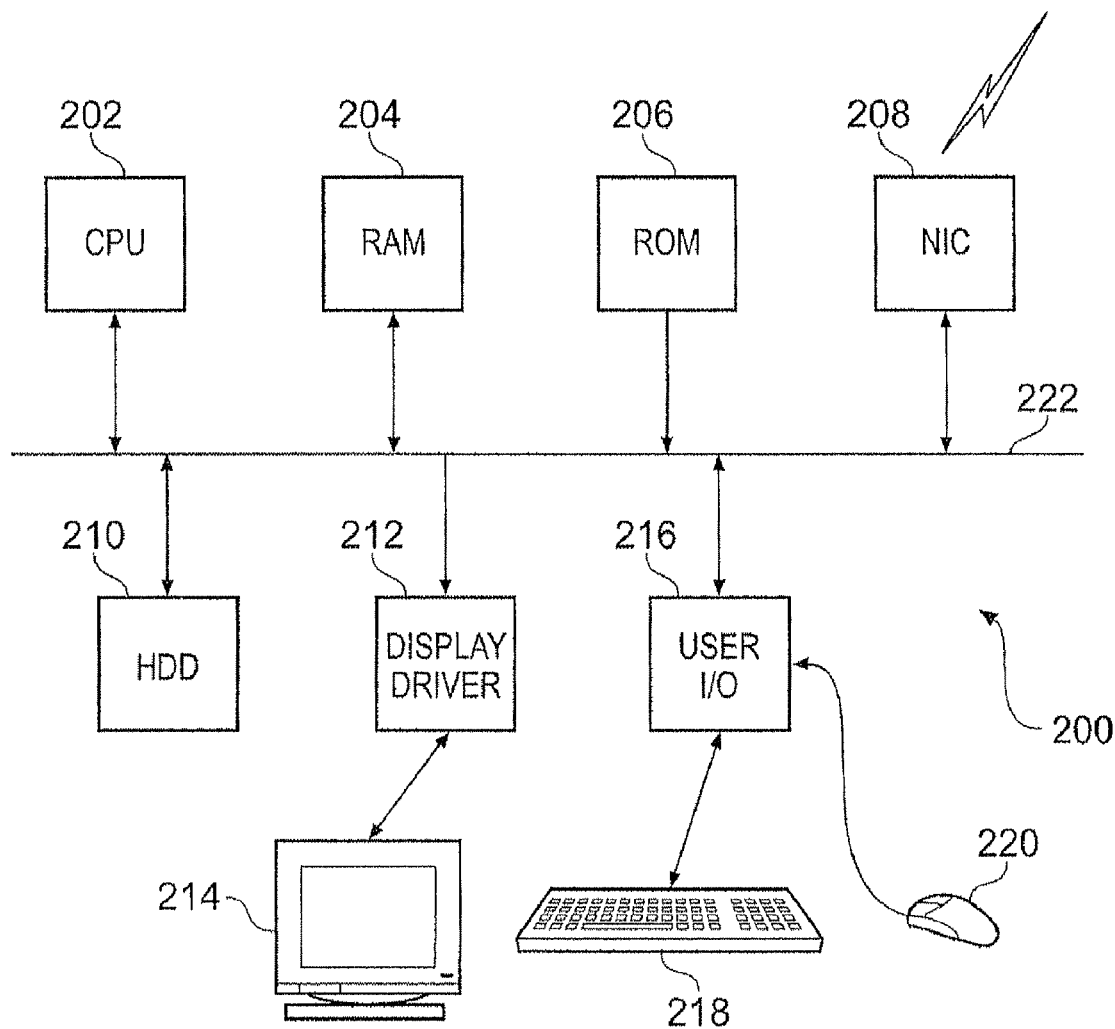
FIG. 8 schematically illustrates a general purpose computer of a type suitable for performing the processing illustrated in at least FIG. 6.

FIG. 8 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 8 is only one example.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims.

We claim:

1. A graphics processing apparatus for rendering a frame of pixel values representing a scene, said graphics processing apparatus comprising:
   rendering circuitry for rendering separately different areas of said frame;
   performance monitoring circuitry coupled to said rendering circuitry to capture for each area rendered one or more performance parameters; and
   a performance parameter memory coupled to said performance monitoring circuitry to store separately for each area said one or more performance parameters captured by said performance monitoring circuitry.

2. The graphics processing apparatus as claimed in claim 1, wherein said scene includes one or more primitives and said frame is formed of a plurality of tiles of pixel values.

3. The graphics processing apparatus as claimed in claim 2, wherein said rendering circuitry is tile-based rendering circuitry responsive to data characterising said one or more primitives to render a sequence of said tiles to generate said frame, each of said tiles being rendered in turn for a selection of said one or more primitives identified as potentially intersecting said tile.

4. The graphics processing apparatus as claimed in claim 1, wherein
   said rendering circuitry upon completion of rendering of a currently active area writes pixel values for said currently active area to a frame memory, and
   said monitoring circuitry writes said one or more performance parameters to said performance parameter memory at times when said rendering circuitry does not have rendered pixel values for a completed area to be written to said frame memory.

5. The graphics processing apparatus as claimed in claim 4, wherein said performance parameter memory and said frame memory are parts of a common shared memory.

6. The graphics processing apparatus as claimed in claim 1, wherein said performance monitoring circuitry comprises one or more counters coupled to respective points within said graphics processing apparatus to count events associated with rendering of each area.

7. The graphics processing apparatus as claimed in claim 6, wherein performance parameter selecting circuitry associated with at least one of said one or more counters is responsive a performance parameter selecting signal to select to which point within said graphics processing apparatus said counter is coupled and accordingly which events are counted.

8. The graphics processing apparatus as claimed in claim 7, wherein said performance parameter selecting signal is user programmable such that a user can select which events are to be counted.

9. The graphics processing apparatus as claimed in claim 1, wherein said one or more performance parameters comprise one or more of:

a number of processing cycles used by said graphics processing apparatus in rendering an area;
a number of cache misses within a cache memory of said graphics processing apparatus when rendering an area;
a number of bus transactions on a bus coupled to said graphics processing apparatus when rendering an area; and
a number of primitives identified as potentially intersecting an area that are processed when rendering said area.

10. The graphics processing apparatus as claimed in claim 1, wherein upon completion of rendering of said frame, said performance parameter memory contains an array of performance parameters corresponding to an array of said areas forming said frame.

11. A non-transitory computer program storage medium storing a driver computer program for controlling a graphic processing apparatus as claimed in claim 1, said driver computer program permitting user selection of said one or more performance parameters to be captured.

12. A non-transitory computer program storage medium as claimed in claim 11, wherein said driver program permits user selection of a storage location to be used as said performance parameter memory.

13. A method of generating monitoring data for a graphics processing apparatus rendering a frame of pixel values representing a scene, said method comprising the steps of:
separately rendering different areas of said frame;
capturing for each area rendered one or more performance parameters; and
separately storing for each area said one or more performance parameters captured.

14. A graphics processing apparatus for rendering a frame of pixel values representing a scene, said graphics processing apparatus comprising:
rendering means for rendering separately different areas of said frame;
performance monitoring means coupled to said rendering means for capturing for each area rendered one or more performance parameters; and
performance parameter memory means coupled to said performance monitoring means for storing separately for each area said one or more performance parameters captured by said performance monitoring means.

15. A graphics processing apparatus for rendering a frame of pixel values representing a scene, said graphics processing apparatus comprising:
rendering circuitry for rendering separately different areas of said frame;
performance monitoring circuitry coupled to said rendering circuitry to capture for each area rendered one or more performance parameters, said performance monitoring circuitry comprising one or more counters coupled to respective points within said graphics processing apparatus to count events associated with rendering of each area;
a counter controller configured to read current values of said one or more counters upon completion of rendering of a currently active area by said rendering circuitry; and
a performance parameter memory coupled to said performance monitoring circuitry to store separately for each area said values of said one or more counter as said one or more performance parameters captured by said performance monitoring circuitry.

16. A method of generating monitoring data for a graphics processing apparatus rendering a frame of pixel values representing a scene, said method comprising the steps of:
separately rendering different areas of said frame;
capturing for each area rendered one or more performance parameters using one or more counters coupled to respective points within said graphics processing apparatus to count events associated with rendering of each area;
reading current values of said one or more counters upon completion of rendering of a currently active area; and
separately storing for each area said values of said one or more counters as said one or more performance parameters captured.

17. A graphics processing apparatus for rendering a frame of pixel values representing a scene, said graphics processing apparatus comprising:
rendering means for rendering separately different areas of said frame;
performance monitoring means coupled to said rendering means for capturing for each area rendered one or more performance parameters, said performance monitoring means comprising one or more counting means, coupled to respective points within said graphics processing means, for counting events associated with rendering of each area;
counter controlling means for reading current values of said one or more counting means upon completion of rendering of a currently active area by said rendering means; and
performance parameter memory means coupled to said performance monitoring means for storing separately for each area said current values of said one or more counting means as said one or more performance parameters captured by said performance monitoring means.

* * * * *